United States Patent
Latha et al.

(10) Patent No.: US 7,078,067 B2
(45) Date of Patent: Jul. 18, 2006

(54) ROASTED AND OLEORESIN FLAVORED NUT FORMULATION AND A PROCESS THEREOF

(75) Inventors: Rangasamy Baby Latha, Mysore (IN); Kodangala Koshawa Bhat, Mysore (IN); Chitradurga Venkataram Raghavan, Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 388 days.

(21) Appl. No.: 10/403,798

(22) Filed: Mar. 31, 2003

(65) Prior Publication Data

US 2004/0191395 A1    Sep. 30, 2004

(51) Int. Cl.
*A23L 1/36*    (2006.01)

(52) U.S. Cl. .................. 426/106; 426/651; 426/632; 426/650; 426/289; 426/615; 426/629; 428/35.2; 428/35.3; 428/35.5

(58) Field of Classification Search ............... 426/632, 426/650–651, 106, 289, 615, 629; 428/35.2, 428/35.3, 35.5
See application file for complete search history.

(56) References Cited

U.S. PATENT DOCUMENTS

| | | | | |
|---|---|---|---|---|
| 2,687,155 A | * | 8/1954 | Molaison et al. | 426/288 |
| 2,860,054 A | * | 11/1958 | Yanick | 426/651 |
| 4,161,545 A | | 7/1979 | Green et al. | 426/93 |
| 4,284,657 A | * | 8/1981 | Stanton | 426/651 |
| 4,692,342 A | | 9/1987 | Gannis et al. | 426/293 |
| 4,738,865 A | | 4/1988 | Morris | 426/658 |
| 4,769,248 A | | 9/1988 | Wilkins et al. | 426/291 |
| 4,910,028 A | * | 3/1990 | Bernacchi et al. | 426/93 |
| 4,931,304 A | | 6/1990 | Sharma | 426/632 |
| 5,061,499 A | | 10/1991 | Holloway, Jr. et al. | 426/93 |
| 5,093,139 A | | 3/1992 | Droog | 426/93 |
| 5,194,278 A | | 3/1993 | Strong | 426/293 |
| 5,718,936 A | * | 2/1998 | Porter et al. | 426/289 |
| 5,804,239 A | * | 9/1998 | Wiersma | 426/302 |
| 5,939,119 A | | 8/1999 | Cheng et al. | 426/302 |

* cited by examiner

*Primary Examiner*—Milton Cano
*Assistant Examiner*—Adepeju O. Pearse
(74) *Attorney, Agent, or Firm*—Ohlandt, Greeley, Ruggiero & Perle, LLP

(57) ABSTRACT

The present invention relates to a flavored nut formulation comprising deep fat fried/dry roasted cashew kernels/peanuts/almonds in the range of 90–98%, salt 1.5–3.0%, oleoresin 1.0–3.0% diluted with 8–12 folds of absolute ethyl alcohol and a process of preparing a flavored nut formulation.

15 Claims, No Drawings

ROASTED AND OLEORESIN FLAVORED NUT FORMULATION AND A PROCESS THEREOF

FILED OF THE INVENTION

The present invention relates to a roasted or fried nut formulation and a method of preparing such formulation. The present invention particularly relates to application of oleoresin on roasted or fried nuts thereby providing uniform coating of the oleoresin on the nuts and retaining the flavor of the nuts.

BACKGROUND AND PRIOR ART REFERENCES

Major limitations of flavoring of nuts such as deep fat fried/dry roasted cashew nuts/peanuts with powdered spices are: (1) presence of thermo resistant bacterial load, which creates safety problems during storage. (2) Non-uniformity of the flavor quality (3) reduced impact of natural spice flavor, and (4) rapid loss of aroma during storage and presence of intense colored spots randomly distributed throughout the surface of the nut. In order to sustain a continuous demand for spiced nuts it is necessary to develop alternate flavorings as well as well as methods of application. The problems encountered by using powdered spices can be overcome to a large extent by developing suitable method of using spice oleoresins to flavor the processed nuts. By definition, the oleoresin is the total soluble extractives of a material in a specified solvent. In flavor work the best oleoresin is that which is a concentrate of all the flavor components (aroma, taste, pungency, and related sensory factors) and which truly recreates, when diluted, the sensory quality of the original natural material. Oleoresins do not have many of the disadvantages inherent in the use of powdered spices in terms of flavored quality, uniformity, and separation of storage. At the same time oleoresin offer convenience, while using in food industry or large-scale preparation. The work reported in this patent gives a detailed account of use of oleoresins for flavoring of deep fat fried/dry roasted cashew nuts.

Reference may be made to 1988 U.S. Pat. No. 4,738,865, in which an adhesive for adhering flavoring which is a mixture of a reducing sugar preferable lactose and a maltodextrin. The adhesive is particularly useful for coating peanuts with a dry honey coating providing honey coated and salted nuts. In the present method adhesives are not used.

Reference may be made to U.S. Pat. No. 4,931,304, 1990, describing a process for flavoring edible nuts which comprises roasting of nuts, partially cooling the nuts to about 56° C. to 92° C., applying a volatile flavoring agent and blending the nuts until the flavor agent is absorbed by the nuts. This patent refers to only volatile flavorings where as oleoresins contain non-volatiles also.

Reference may be made to 1993 U.S. Pat. No. 5,194,278, which relates to edible cores, especially nuts (peanuts, cashews etc) having a desirable fruit flavoring. More particularly the invention relates to edible cores which are prepared by coating with an adhesive solution containing a source of fruit flavoring and then roasting, to provide a snack having desired toasted taste and appearance and a fruit flavoring the present invention does not make use of adhesive solutions.

Reference may be made to U.S. Pat. No. 5,061,499, which describes the coating the raw nuts (peanuts, cashews etc) with an adhesive solution containing honey, corn syrup, sucrose, carbohydrate gum and water followed by a coating of powdered sugar, roasting the nuts preferably in oil, and then applying a coating of a dry mixture of sugar and salt. The final coating is tightly adherent after roasting. Present invention relates to a single stage coating without using adhesive.

Reference may be made to U.S. Pat. No. 5,939,119, which describes a process for coating nuts by immersing the nuts in a molten edible material to coat the nuts with molten edible material, separating the excess molten edible material and then cooling the coated nuts to solidify the molten edible materials. The present invention does not involve coating by immersion.

Reference may be made to U.S. Pat. No. 5,093,139, relating the to a method of preparing roasted sunflower shells containing seeds having a generally uniform coating of a flavoring agent. A liquid flavor containing a coating solution is used in the form of a spray. The present invention does not use a coating solution.

Reference may be made to 1987 U.S. Pat. No. 4,692,342, describing a process for honey-roasting nuts by applying a predusting of a minor amount of an adhesive, film-forming material, honey and water; enrobing the adhesive coated nuts with a dry mixture of honey sugar and salt; and subjecting the coated nuts to roasting, preferably air roasting. Present process does not use any dusting material or film forming material.

Reference may be made 1979 U.S. Pat. No. 4,161,545, which describes the coating nuts with the combination of honey and water followed by enrobing with a dry mixture of sugar and starch and the nuts are then roasted. The present process does not relate to use of honey or sugar or starch.

Reference may be made to 1987 U.S. Pat. No. 4,692,342, that describes the storage stability of prepared peanuts/cashew nuts by applying a pre-dusting of minor amount of an adhesive and coating material and the product was air roasted. But the present process does not contain any pre-dusting material or any coating material and here the product is not air roasted it is deep fat fried and flavored.

Reference may be made to 1988 U.S. Pat. No. 4,769,248, relates to the a process for preparing dry roasting nuts, comprising applying a uniform coating of a starch to raw nuts, applying, a uniform coating of a gelatin solution to the starch coated nuts by applying a coating of a seasoning mix to the coated nuts, and roasting the resulting nuts. But in this present invention the nuts are not roasted after flavor addition.

OBJECTS OF THE INVENTION

The main object of the invention is to provide a roasted and flavored nut formulation, which obviates from the drawbacks listed above.

An object of the present invention is to provide roasted and uniformly oleoresin flavored nuts.

It is also an object of the present invention to provide a process for the preparation of roasted and uniformly oleoresin flavored nuts.

Still another object of the present invention is to provide a process with a liquid coating, which strongly adheres to the surface of the nuts.

Yet another object of the present invention is to provide a process that does not use any separate binding agent in order to improve or maintain the flavor and aroma of the roasted or deep fried nuts.

SUMMARY OF THE INVENTION

The present invention provides roasted or fried nut formulation and a method of preparing such formulation. The present invention particularly provides an application of oleoresin on roasted or fried nuts thereby providing uniform coating of the oleoresin on the nuts and retaining the flavor of the nuts.

DETAILED DESCRIPTION OF THE INVENTION

Accordingly, the present invention provides a uniformly flavored roasted or fried nut comprising,
- (a) nuts 90–98% by weight;
- (b) salt 1.5–3% by weight;
- (c) oleoresin of pepper 0.5–3.0% by weight; and
- (d) oleoresin of chilli 1.0–3.0% by weight.

An embodiment of the present invention, wherein the roasted nut or fried nut is selected from a group consisting of deep fat fried/dry roasted cashew kernels, peanuts, almonds and cereals.

Another embodiment of the present invention, wherein the salt used is having particle size in the range of BSS–72 to +100, which is a metal halide selected from the group consisting of sodium chloride, potassium chloride, etc Yet another embodiment of the present invention, wherein the oleoresin used is diluted with ethyl alcohol.

Further embodiment of the present invention, wherein diluted oleoresin consisting of oleoresin and ethyl alcohol in the ratio of about 1:8 to 12 times by weight.

The present invention also provides a process for preparing flavored dry roasted nuts as claimed in claim 1, said process comprising the steps of:
- (a) preparing the salt in a pulverizer to obtain salt having particle size in the range of BSS–72/+100 mesh;
- (b) dissolving chilli oleoresin and pepper oleoresin in 8 to 12 times by weight of ethyl alcohol to obtain respective oleoresin solutions;
- (c) loading de-skinned nuts in a revolving drum having heating means;
- (d) spraying 1.5–3% of pulverized salt of step (a) by using spraying gun which is directed on to the nuts in the revolving drum;
- (e) introducing the diluted oleoresin chilli/pepper by using spray gun which is directed onto the nuts in the revolving drum and tumbling for 5 to 15 minutes;
- (f) discharging the kernels onto trays and spreading them as a single layer;
- (g) drying the kernels in a hot air circulation dryer maintained at 50–75° C. for 30–90 minutes;
- (h) cooling the dried kernels by in an atmosphere having less than 50% Relative humidity for 20–40 minutes; and
- (i) packing the cooled kernels in polyester poly or metallised polyester pouches.

An embodiment of the present invention, a process wherein in step (iii), the kernels are previously blanched using brine solution containing (15–20%) sodium chloride for 1–3 minutes by placing them in a perforated stainless steel vessel followed by draining in a tray and drying at a temperature range of 80–95° C. for 60–90 minutes.

Another embodiment of the present invention, a process wherein the de-skinning of nuts is carried out either manually or using any mechanical means. Still another embodiment of the present invention, a process wherein the drum is rotated or tumbled at a speed of about 30 to 40 rpm.

Yet another embodiment of the present invention, a process wherein liquid spray consisting of oleoresin in a diluted form is used for uniform flavoring.

Further embodiment of the present invention, a process wherein a liquid coating is applied that strongly adheres to the surface of the nuts.

Yet another embodiment of the present invention, a process wherein the nuts in the range of 90–98% are taken for flavoring.

Still another embodiment of the present invention, a process wherein the salt in the range of 1.5–3% is powdered in the pulveriser and sieved to obtain a particle size of –72/+100 mesh (BS).

Yet another embodiment of the present invention, a process wherein chill/pepper oleoresin in the range of 1.0–3.0% is diluted with 8–12 folds, by adding absolute ethyl alcohol.

Further embodiment of the present invention, a process wherein deep fat fried/dry roasted cashew kernels/peanuts/almonds are loaded into the drum; revolving at a speed of 30–40 rpm.

Yet another embodiment of the present invention, a process wherein the fried/dry roasted cashew kernels/peanuts/almonds are salted in the range of 1.5–3% by using spraying gun which is directed on to the revolving drum.

Still another embodiment of the present invention, a process wherein salted fried/dry roasted nuts are flavored with diluted oleoresin (pepper/chilli) by using a liquid sprayer which is directed on to the revolving drum.

Yet another embodiment of the present invention, a process wherein the flavored nuts are allowed to mix thoroughly in the revolving drum for 5–10 minutes to obtain a uniformly flavored cashew kernels/peanuts/almonds.

Further embodiment of the present invention, a process wherein the flavored nuts are dried in a try drier at the temperature in the range of 50–75° C. for 30–90 minutes.

Yet another embodiment of the present invention, a process wherein the dried nuts are allowed to cool in an atmosphere of less than 50% RH for 30–90 minutes.

Novel aspects of the present invention are further explained in the form of following embodiments:
- Spice oleoresin in a suitably diluted form is used for flavouring of deep fat fried/dry roasted cashew kernels.
- The process does not use any binding agent.
- Salt of appropriate particle size is added as a fine spray using a powder sprayer.
- Uniform coating is ensured by diluting the oleoresin with ethyl alcohol.
- The method is applicable for both deep fat fried and dry roasted cashew kernel.

Following examples are given by way of illustrations of the present invention.

EXAMPLE 1

Following ingredients are taken in quantities given below.

| | |
|---|---|
| Fried cashew kernels | 500 g |
| Powdered salt | 7.5 g |
| Pepper oleoresin | 5 g |
| Ethyl alcohol | 50 g |

Salt is powdered in a pulverizer and sieved through a standard sieve to obtain a particle size of –72/+100. Pepper oleoresin (5 g) is diluted with 50 g of ethyl alcohol. Then the fried kernels are fed to the drum revolving at 30 rpm and 7.5 grams of salt is sprayed using the sprayer. The spray of powdered salt directed onto the rotary drum. Diluted pepper oleoresin is sprayed over the cashew kernel using a liquid sprayer. The flavored cashew kernels are further mixed thoroughly for another 5 minutes to obtain uniformly flavored cashew kernels. The cashew kernels are then dried in a try drier for 60° C. for 60 minutes and then allowed to cool at 24–26° C. and 45% RH for 40 minutes.

EXAMPLE 2

Following ingredients are taken in quantities given below.

| | |
|---|---|
| Fried cashew kernels | 500 g |
| Powdered salt | 7.5 g |
| Chilli oleoresin | 5 g |
| Ethyl alcohol | 50 g |

Salt is powdered in a pulverizer and sieved through a standard sieve to obtain a particle size of −72/+100. Chilli oleoresin (5 g) is diluted with 50 g of ethyl alcohol. Then the fried kernels are fed to the drum revolving at 30 rpm and 7.5 g of salt are sprayed using the sprayer. The spray of powdered salt directed onto the rotary drum. Diluted chilli oleoresin is sprayed over the cashew kernel using a liquid sprayer. The flavored cashew kernels are further mixed thoroughly for another 10 minutes to obtain uniformly flavored cashew kernels. The cashew kernels are then dried in a try drier for 70° C. for 30 minutes and then allowed to cool under room temperature at 45% RH for 40 minutes.

EXAMPLE 3

Following ingredients are taken in quantities given below.

| | |
|---|---|
| Dry roasted cashew kernel | 1000 g |
| Powdered salt | 12 g |
| Pepper oleoresin | 8 g |
| Ethyl alcohol | 120 g |

Salt is powdered in a pulverizer and sieved through a standard sieve to obtain a particle size of −72/+100. Pepper oleoresin is diluted with 30 g of ethyl alcohol. Then the dry roasted cashew kernels are fed to the drum revolving at 30 rpm and 12 g of salt is sprayed using the powder sprayer. Diluted pepper oleoresin is sprayed over the cashew kernels tumbling in the drum and mixed thoroughly for another 5 minutes. Cashew kernels are then dried in a tray drier at 55° C. for 40 minutes and allowed to cool under ambient condition (26–27° C. and 40–45% RH) for 25 minutes.

EXAMPLE 4

Following ingredients are taken in quantities given below.

| | |
|---|---|
| Dry roasted cashew kernel | 1000 g |
| Powdered salt | 12 g |
| Chilli oleoresin | 8 g |
| Ethyl alcohol | 120 g |

Salt is powdered in a pulverizer and sieved through a standard sieve to obtain a particle size of −72/+100. Chilli oleoresin is diluted with 30 g of ethyl alcohol. Then the dry roasted cashew kernels are fed to the drum revolving at 30 rpm and salt 3 g is sprayed by using the powder sprayer. Diluted chilli oleoresin is sprayed over the cashew kernels tumbling in the drum and mixed thoroughly for another 5 minutes. Cashew kernels are then dried in a tray drier at 55° C. for 40 minutes and allowed to cool under ambient condition (26–27° C. and 40–45% RH) for 25 minutes.

EXAMPLE 5

Following ingredients are taken in quantities given below.

| | |
|---|---|
| Dry roasted peanuts | 1000 g |
| Powdered salt | 20 g |
| Chilli oleoresin | 2 g |
| Ethyl alcohol | 100 ml |

Salt is powdered in a pulverizer and sieved through a standard sieve to obtain a particle size of −72/+100. Chilli oleoresin (2 gm) was diluted in ethyl alcohol (100 ml). Then the dry roasted and de-skinned peanuts are fed to the drum revolving at 30 rpm. Diluted chilli oleoresin is sprayed over the peanuts tumbling in the drum and mixed thoroughly for another 5 minutes. Peanuts are then dried in a tray drier at 55° C. for 40 minutes and allowed to cool under ambient condition (26–27° C. and 40–45% RH) for 25 minutes.

EXAMPLE 6

Following ingredients are taken in quantities given below.

| | |
|---|---|
| Dry roasted almonds | 1000 g |
| Powdered salt | 20 g |
| Chilli oleoresin | 2 g |
| Ethyl alcohol | 100 ml |

Salt is powdered in a pulverizer and sieved through a standard sieve to obtain a particle size of −72/+100. Chilli oleoresin (2 gm) was diluted in ethyl alcohol (100 ml). Then the dry roasted almonds are fed to the drum revolving at 30 rpm. Diluted chilli oleoresin is sprayed over the almonds tumbling in the drum and mixed thoroughly for another 5 minutes. Almonds are then dried in a tray drier at 55° C. for 40 minutes and allowed to cool under ambient condition (26–27° C. and 40–45% RH) for 25 minutes.

ADVANTAGES

1. Instead of powdered spices, oleoresins are used resulting in uniform coating.
2. Diluted oleoresin when applied to the kernel does not require any binding agent whereas while adding powdered spices binding agent is needed for better adhesion.
3. Since the flavoring is in the liquid form, the problem of separation of flavoring during handling and storage is totally avoided.
4. Spice oleoresin coated as a thin film all over the kernel gives uniform color to the surface.
5. In the case of fried kernels the coating of oleoresin offers protection to the surface oil.

We claim:
1. A process of preparing flavored dry roasted nuts comprising steps of:

(a) preparing the salt in a pulverizer to obtain salt having particle size in range of BSS Sieve −72/+100 mesh;
(b) dissolving chilli oleoresin and pepper oleoresin in 8 to 12 times by weight of ethyl alcohol to obtain respective oleoresin solutions;
(c) loading de-skinned nuts in a revolving drum having heating means;
(d) spraying 1.5–3% of pulverized salt of step (a) by using spraying gun which is directed on to the nuts in the revolving drum;
(e) introducing the diluted oleoresin chilli/pepper by using spray gun which is directed onto the nuts in the revolving drum and tumbling for 5 to 15 minutes;
(f) discharging the kernels onto trays and spreading them as a single layer;
(g) drying the kernels in a hot air circulation dryer maintained at 50–75° C. for 30–90 minutes;
(h) cooling the dried kernels by in an atmosphere having less than 50% Relative humidity for 20–40 minutes; and
(i) packing the cooled kernels in polyester poly or metallised polyester pouches.

2. The process of claim 1, wherein in step (c), the kernels are previously blanched using brine solution containing (15–20%) sodium chloride for 1–3 minutes by placing them in a perforated stainless steel vessel followed by draining in a tray and drying at a temperature range of 80–95° C. for 60–90 minutes.

3. The process of claim 1, wherein the de-skinning of nuts is carried out either manually or using any mechanical means.

4. The process of claim 1, wherein the drum is rotated or tumbled at a speed of about 30 to 40 rpm.

5. The process of claim 1, wherein liquid spray consisting of oleoresin in a diluted form is used for uniform flavoring.

6. The process of claim 1, wherein a liquid coating is applied that strongly adheres to the surface of the nuts.

7. The process of claim 1, wherein the nuts in the range of 90–98% is taken for flavoring.

8. The process of claim 1, wherein the salt in the range of 1.5–3% is powdered in the pulveriser and sieved to obtain a particle size of −72/+100 mesh (BS).

9. The process of claim 1, wherein chilli/pepper oleoresin in the range of 1.0–3.0% is diluted with 8–12 folds, by adding absolute ethyl alcohol.

10. The process of claim 1, wherein deep fat fried/dry roasted cashew kernels/peanuts/almonds are loaded into the drum; revolving at a speed of 30–40 rpm.

11. The process of claim 6, wherein the fried/dry roasted cashew kernels/peanuts/almonds are salted in the range of 1.5–3% by using spraying gun which is directed on to the revolving drum.

12. The process of claim 1, wherein salted fried/dry roasted nuts are flavored with diluted oleoresin (pepper/chilli) by using a liquid sprayer which is directed on to the revolving drum.

13. The process of claim 1, wherein the flavored nuts are allowed to mix thoroughly in the revolving drum for 5–10 minutes to obtain a uniformly flavored cashew kernels/peanuts/almonds.

14. The process of claim 1, wherein the flavored nuts are dried in a tray drier at a temperature in the range of 50–75° C. for 30–90 minutes.

15. The process of claim 6, wherein the dried nuts are allowed to cool in an atmosphere of less than 50% RH for 30–90 minutes.

* * * * *